UNITED STATES PATENT OFFICE.

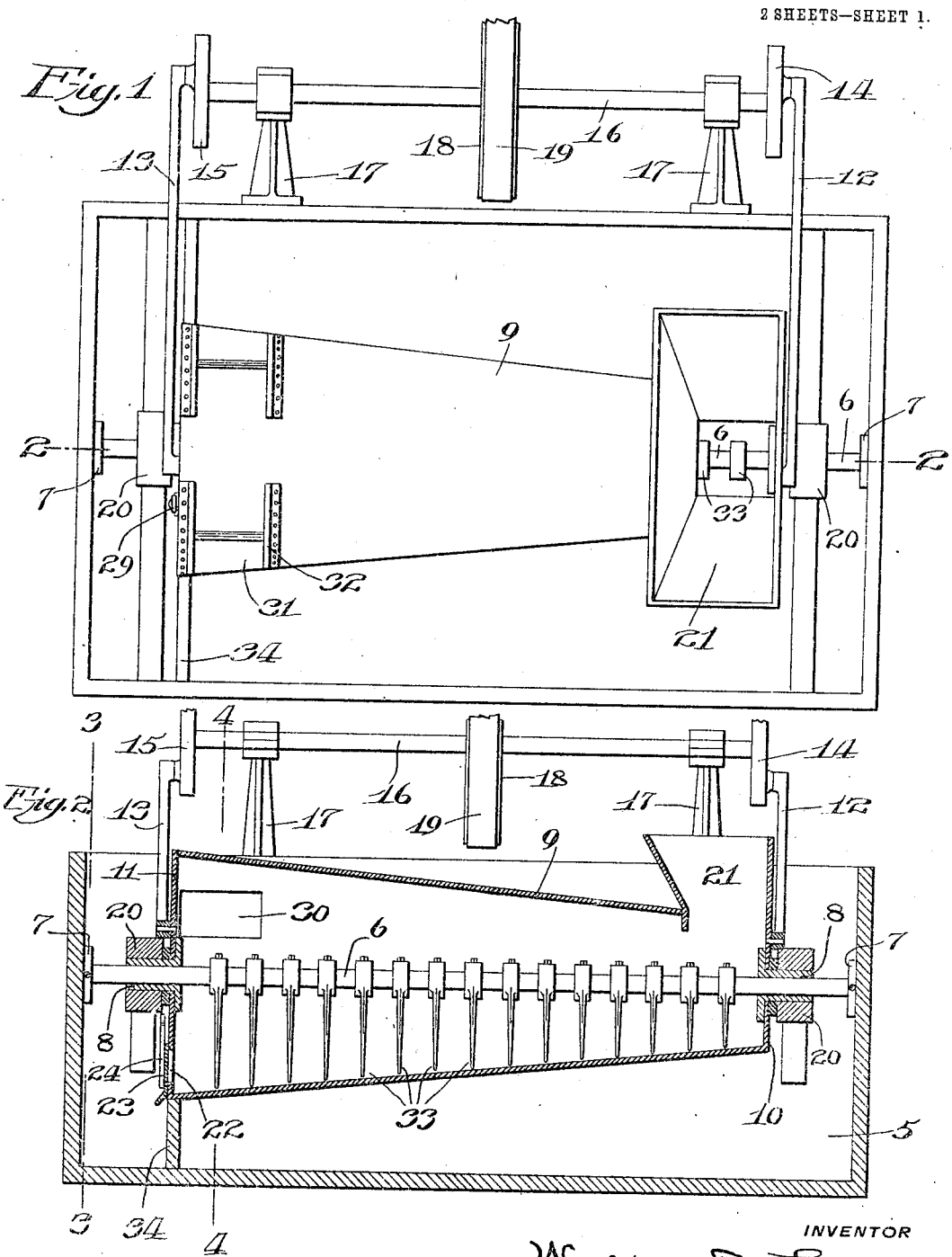

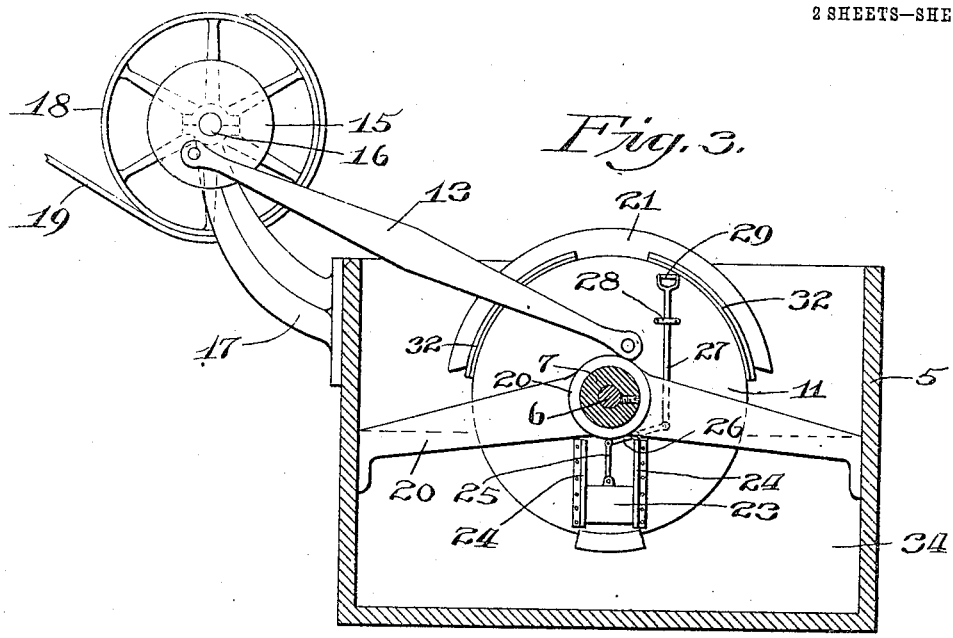
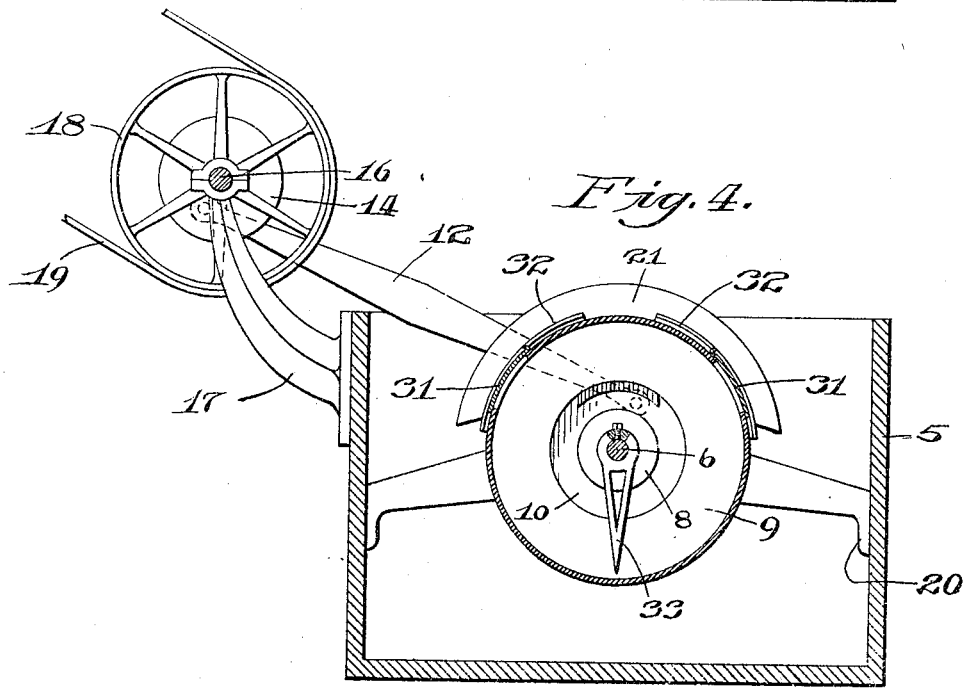

WALTER R. LINS, OF PHILADELPHIA, PENNSYLVANIA.

ORE SEPARATING OR CONCENTRATING MACHINE.

962,575.  Specification of Letters Patent.  Patented June 28, 1910.

Application filed February 13, 1909. Serial No. 477,638.

*To all whom it may concern:*

Be it known that I, WALTER R. LINS, citizen of the United States, residing at Philadelphia, in the county of Philadelphia and State of Pennsylvania, have invented certain new and useful Improvements in Ore Separating or Concentrating Machines, of which the following is a specification.

This invention relates to machines for separating or concentrating ores.

The object of the invention is to provide a simple and efficient construction and organization of mechanism whereby the concentrates may be separated from the ores by passing the latter through the machine.

Having this object in view, the invention consists in the novel construction and combinations of parts which will be hereinafter fully described and claimed.

In the drawings:—Figure 1 is a plan view of my improved machine. Fig. 2 is a longitudinal section thereof on line 2—2 of Fig. 1. Fig. 3 is a transverse section on line 3—3 of Fig. 2. Fig. 4 is a transverse section on line 4—4 of Fig. 2.

5 designates a suitable tank which may be of any shape and size for its intended purpose. Extending longitudinally through the tank 5 is a fixed shaft 6 the ends of which are supported by bearings 7 on the interior of the end walls of the tank 5. Loosely mounted on the shaft 6 are the end hubs 8 of a tapering, conical, rocking drum 9.

The preferred means for rocking the drum 9 is as follows:—Connected to the end heads 10 and 11 of the drum 9 are the inner ends of arms 12 and 13 respectively, the outer ends of which are connected to cranks or wheels 14 and 15 respectively on the ends of a shaft 16 which is journaled in bearings 17 on the outside of the tank 5. This shaft 15 is provided with a pulley 18 which is driven by a belt 19 from any suitable source of power. The connection of the arms 12 and 13 with the cranks 14 and 15 and the end heads 10 and 11 of the drum 9 respectively is such that during the rotation of the shaft 16 and therewith the cranks 14 and 15, the arms 12 and 13 will rock the drum 9 back and forth.

The hubs 8 of the drum 9 not only surround the fixed shaft 6 but they also extend into bearing brackets 20 which extend between the inner side walls of the tank 5 and serve to support the shaft 6 and drum 9.

The upper portion of the smaller end of the drum 9 is provided with a feed opening 21 through which the ore is fed to the interior of the drum. The lower portion of the drum is provided with a discharge opening 22 therein which is closed by a sliding gate 23. The gate 23 is fitted to lateral guide ways 24 on the end head 11, and connected to the top of the gate 23 is the lower end of a link 25, the upper end of which is connected to one end of a lever 26, which is fulcrumed on the end head 11. The other end of the lever 26 is connected to the lower end of a hand operated rod 27 which extends upwardly through a bracket 28 on the end head 11, the upper end of the rod 27 being provided with a suitable handle 29. It will thus be seen that if the rod 27 be forced downwardly, the lever 26 will act upon the link 25 in a manner to raise or open the gate 23, thus permitting the material within the larger end of the drum 9 to be discharged through the opening 22.

The sides of the drum 9 are provided with lateral discharge openings 30 therein, which are arranged above the bottom of the drum 9 and near the larger end thereof, for a purpose hereinafter explained. These openings may be closed by suitable sliding gates 31 which are fitted to guides 32 on the exterior of the drum 9.

The fixed shaft 6 has affixed thereto a series of downwardly extending arms 33 which project from the shaft 6 to a position adjacent the bottom of the drum 9, for a purpose hereinafter explained.

The tank 5 is provided with a transverse partition wall 34 which extends part way around the larger end of the drum 9 and it is located between the discharge opening 23 in the end wall 11 of the drum 9 and the lateral discharge openings 30 in the side walls of the drum 9, whereby material discharged from the opening 22 will fall into the tank on one side of the partition 34, and material discharged from the openings 30 will fall into the tank on the other side of the partition 34.

The operation of the machine is as follows:—The tank 5 and drum 9 may be supplied with water or the water may be omitted, as desired, the same being determined by the nature of the ore to be separated. Power is applied to the shaft 16 through the belt 19 and pulley 18, thus causing the constant back-and-forth or rocking motion of the drum 9. During this rocking action of the drum 9, the ore is introduced through the feed opening 21 to the smaller end of the drum 9, and the ore passes through the drum from the smaller end to the larger end thereof by gravity. During the back-and-forth rocking motion of the drum 9, the ore is carried from side to side, and as the drum is brought to rest at each side during the rocking thereof, the ore falls down toward the center and is then rocked to the opposite side of the drum. Thus the ore is caused to flow back and forth transversely of the drum during its longitudinal passage therethrough, and as the ore moves back and forth it is engaged and agitated by the fixed arms 33. This operation thoroughly agitates the ore, and the concentrates being heavier than the waste matter settle to the bottom of the drum. When the ore reaches the larger end of the drum the waste matter above the concentrates is discharged through the lateral openings 30 each time the drum 9 is rocked back and forth, the location of the openings 30 and the extent of movement of the drum 9 being such that the waste matter only will be discharged from the openings 30, while the heavier concentrates below the waste matter remain in the drum. These concentrates may be removed from the larger end of the drum from time to time through the opening 22 after the gate 23 has been opened.

The gate 23 may be adjusted in respect to the opening 22, that the proportion of concentrates passing through the machine with the waste matter may be constantly discharged through the opening 22 while the waste matter is being discharged through the openings 30.

The waste matter discharged through the openings 30 falls on one side of the partition 34, and the concentrates discharged through the opening 22 fall on the other side of the partition 34, thereby maintaining the concentrates separate from the waste matter.

I claim:—

1. In a machine of the character described, the combination of a support; a drum provided with side walls, a downwardly inclined bottom portion and a transverse end wall at the lower end of said bottom portion, said side walls having normally unobstructed openings therein above said bottom portion and below the top of the drum, said drum having a space extending from end to end thereof to be occupied by material resting directly on said bottom portion, and said end wall having a discharge opening therein below the first named openings; and means for rocking the drum laterally.

2. In a machine of the character described, the combination of a support; a fixed shaft; a drum mounted on said shaft and provided with side walls, a downwardly inclined bottom portion and a transverse end wall at the lower end of said bottom portion, said side walls having normally unobstructed openings therein above said bottom portion and below the top of the drum, said drum having a space extending from end to end thereof to be occupied by material resting directly on said bottom portion, and said end wall having a discharge opening therein below the first named openings; means for rocking the drum laterally; and arms projecting downwardly from said shaft within the drum to a position adjacent the bottom portion thereof.

In testimony whereof I affix my signature in presence of two witnesses.

WALTER R. LINS.

Witnesses:
A. V. GROUPE,
WM. HARRISON SMITH.